US005805647A

United States Patent [19]

Schäfer et al.

[11] Patent Number: 5,805,647

[45] Date of Patent: Sep. 8, 1998

[54] METHOD FOR DETECTING THE BEGINNING OF TIME MESSAGES

[75] Inventors: Gerhard Schäfer, Weinsberg; Bernd Memmler, Rosengarten-Rieden, both of Germany

[73] Assignee: Temic Telefunken microelectronic GmbH, Heilbronn, Germany

[21] Appl. No.: 635,244

[22] Filed: Apr. 12, 1996

[30] Foreign Application Priority Data

Apr. 13, 1995 [DE] Germany ........................ 195 14 031.1

[51] Int. Cl.[6] ........................ H04L 7/00

[52] U.S. Cl. .......................... 375/366; 375/365; 375/368; 375/369; 370/513; 370/514; 368/47

[58] Field of Search .................................... 375/365, 366, 375/368, 369; 370/513, 514; 368/47

[56] References Cited

U.S. PATENT DOCUMENTS 4,344,180 8/1982 Cummiskey ............................ 375/368
4,768,178 8/1988 Conklin et al. ........................... 368/47
5,199,051 3/1993 Nakabayashi et al. ................. 375/369

FOREIGN PATENT DOCUMENTS 0656572 6/1995 European Pat. Off. .
4304321 8/1993 Germany .
4319946 12/1993 Germany .

OTHER PUBLICATIONS

Gerd Klawitter: "Zeitzeichenseender", 11. Aufl., Meckenheim, Siebel 1988, pp. 84–97.

Bernard Sklar: "Digital Communications; Fundamentals and Applications." Prentice Hall, New Jersey, 1988, pp. 460–464, title pg., pp. vii–xix, pp. 429–472.

H. Friedberg and W.A. Kral: "Funkzeit und Funkuhren; Zeitsignalempfang fuer Industrie– und Privatbereich". nachrichten elektronik 8, 1978, pp. 257–259.

Jahrbuch der Deutschen Gesellschaft fuer Chronometrie e.V., Stuttgart, 1980, vol. 31, pp. 45–50.

*Primary Examiner*—Stephen Chin
*Assistant Examiner*—Frederick Yu
*Attorney, Agent, or Firm*—Spencer & Frank

[57] ABSTRACT

The invention relates to a method for detecting the beginning of time messages in the signal received from a time-signal transmitter. The signal of the time-signal transmitter consists of a series of blanking intervals on a carrier signal in the seconds clock cycle in which blanking intervals of different length cause different information units to be transmitted (ZERO pulse, ONE pulse, frame pulse). A time message, comprising the information units transmitted over a period of one minute, contains the actual time information in coded form. The time message has areas/sectors with defined, constant information units and areas/sectors with variable contents that code the time information. A reference message is stored in a first area of memory that contains the defined, constant information units that are located in fixed areas/sectors. A number of successive information units corresponding to the length of a time message are stored in a second area of memory. The contents of the first area of memory are compared unit for unit with the second area of memory. If an error occurs during comparison, the reference message in the first area of memory is shifted by one unit with respect to the received information units and subsequently compared again until no error occurs. When agreement is established, the number of shifts is used to determine the beginning of the received time message.

9 Claims, 2 Drawing Sheets

METHOD FOR DETECTING THE BEGINNING OF TIME MESSAGES

BACKGROUND OF THE INVENTION

The invention relates to a method for detecting the beginning of time messages in the signal received from a time-signal transmitter, where the signal of the time-signal transmitter consists of a series of blanking intervals on a carrier signal in the seconds clock cycle in which blanking intervals of different length cause different information units to be created (ZERO pulse, ONE pulse, frame pulse) and a time message comprises the information units transmitted over a period of one minute, and has areas/sectors with defined, constant information units located at fixed points and areas/sectors with variable contents that code the time information.

Most time-signal transmitters in the longwave range transmit the time information bit-serially over a period of one minute; this is the case for example with the DCF-77 transmitter of the Physikalisch-Technische Bundesanstalt in Germany and the WWVB time-signal transmitter in the USA.

The various information units (e.g. binary zero, binary one and/or frame pulses) are transmitted by pulse-width modulation of the blanking intervals that are generated in the seconds clock cycle by lowering of the carrier amplitude under the control of a reference clock.

The meaning of the information received within the time message (minutes, hours, day, year) can, however, only be interpreted when the beginning of the time message, i.e. the beginning of a minute, has been identified. In the transmission protocol of the WWVB transmitter, the beginning of the time message or of the minute is identified by two successive frame pulses, and in the case of DCF-77 by omission of the 59th seconds pulse.

In known radio-controlled clocks these marks are detected directly, for instance by comparing with threshold values. These direct methods have the disadvantage, however, of being dependent on a single marking and are therefore particularly susceptible if noise signals overlay this marking in the received signal.

SUMMARY OF THE INVENTION

The object of the invention is therefore to specify a method for detecting the beginning of a time message of the kind described at the outset that works reliably even with received signals that are overlaid by noise signals. This object is solved by a method for detecting the beginning of time messages in the signal received from a time-signal transmitter, whereby a reference message is stored in a first area of memory containing the defined, constant information units located at fixed areas/sectors; a number of successive information units corresponding to the length of the time message are stored in a second area of memory; the contents of the first area of memory are compared unit for unit with the second area of memory; if an error occurs the reference message is shifted in terms of the received information units by one unit at a time in the first area of memory and then compared again until no further error occurs, and when agreement is found, the number of shifts is taken to determine the beginning of the received time message.

To reduce the error probability, at least two successive time messages are received and stored overlaid. The received information units are weighted with the probability for their detection.

Different information units are given different signs. The probabilities for the first information unit are given a negative sign and the probabilities for the second information unit are given a positive sign. On the basis of the established number of shifts, the evaluation of the information units with respect to the information contained in the time message is synchronized with the signal flow of the time-signal transmitter.

DESCRIPTION OF THE PREFERRED EMBODIMENTS

The transmitters considered here transmit the time and date information in the course of a minute in accordance with a pattern defined by each country, namely the time protocol. In these protocols, invariably defined information units are transmitted at predetermined positions. To detect the beginning of a time message (the beginning of a minute), these fixed, predefined information units are compared with a reference message. The precise sequence involved in this method will be explained by considering as an example the time protocol of the time-signal transmitter WWVB.

Figure 2:
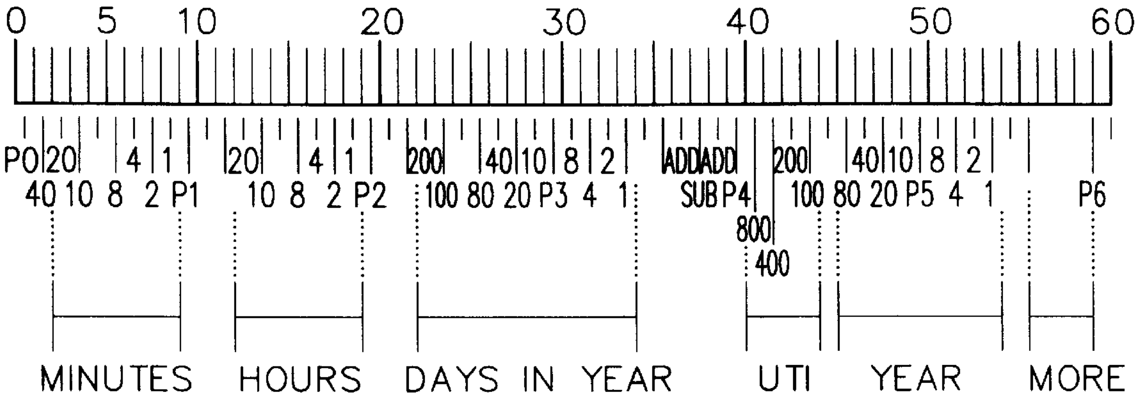
FIG. 2 shows the Transmission protocol used by the longwave time-signal transmitter WWVB.
Figure 3:
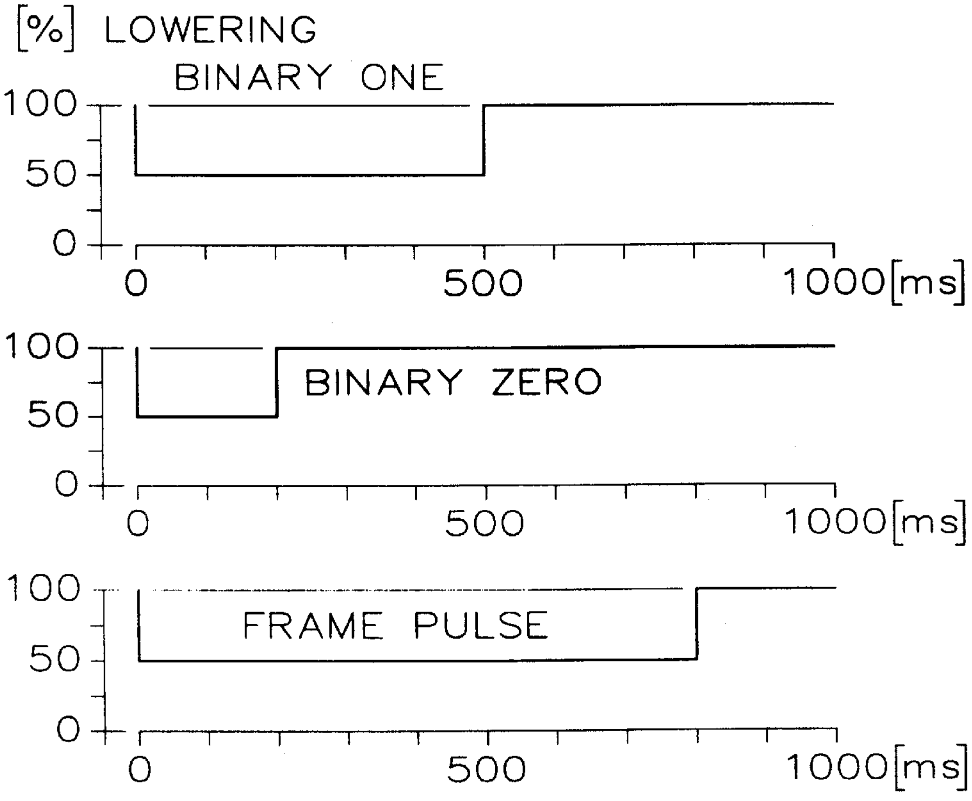
FIG. 3 shows the Pulse shapes and lengths of the possible seconds pulses of the transmitter WWVB.

FIG. 2 shows the positions within the course of a minute at which the time and date information is coded in accordance with the time protocol. Additional pulses, differing from the information bits as such, are provided at fixed intervals. These are known as frame pulses and have the reference codes P0 to P6 in FIG. 2. In the WWVB transmitter, the frame pulses are marked by seconds pulses having a blanking interval of 800 ms. Binary ones are shown as blanking intervals with a length of 500 ms and binary zeros as blanking intervals with a length of 200 ms. Also, binary zeros are always transmitted at the free locations in the time message that do not hold information, i.e. the blanking interval of this seconds pulse that is not used for coding additional information is always 200 ms. These bits are placed together with the frame pulse in a reference message and stored in a first area of memory of a processor in the radiocontrolled clock. The first area of memory has at least one location for each seconds pulse of the time message.

Figure 1:
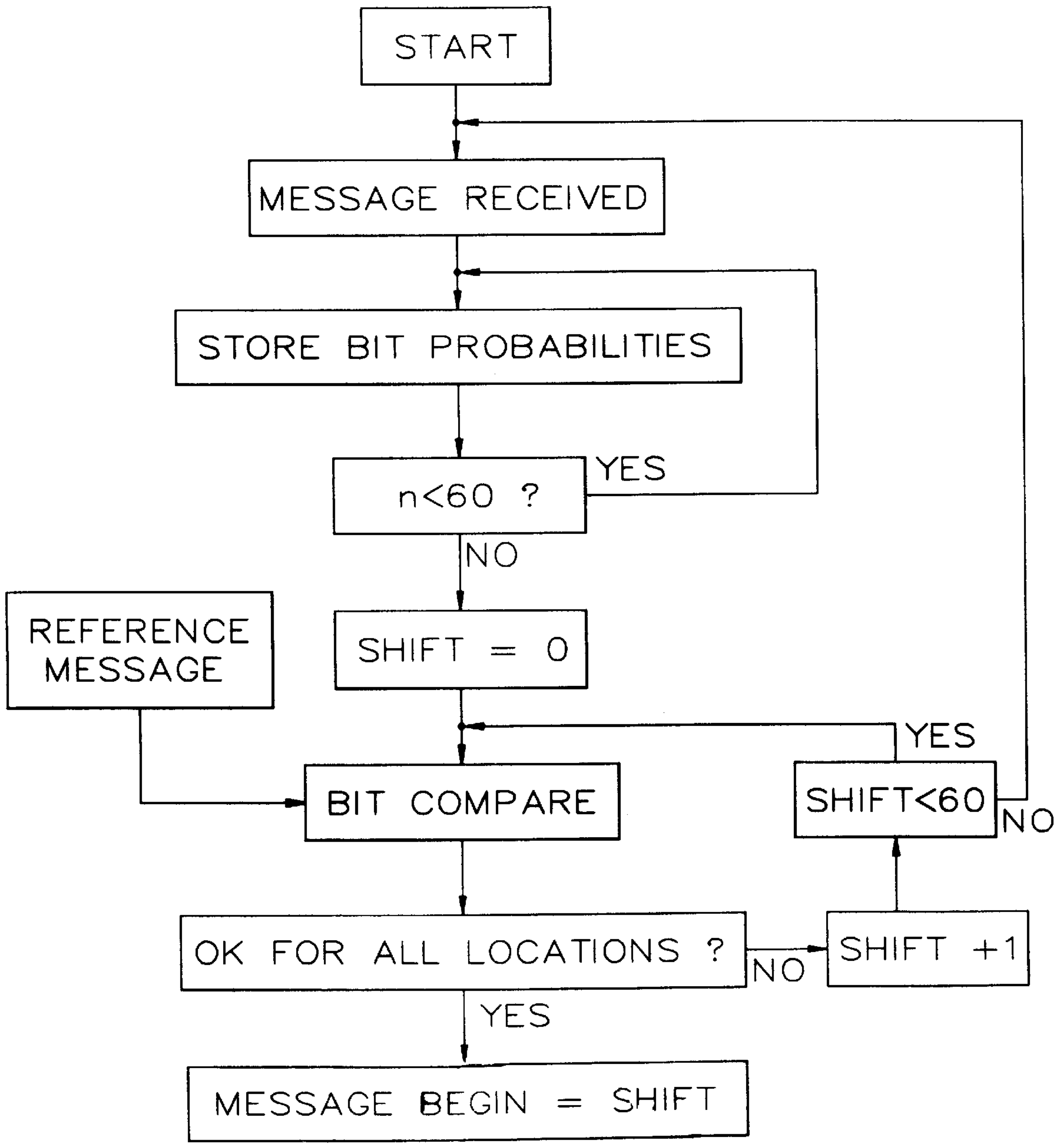
FIG. 1 shows a Flowchart for the Method.

The further steps in the process are shown in the flowchart portrayed in FIG. 1. To detect the beginning of the time message, the individual information units of a signal section are decoded with a length corresponding to the length of a time message. In the case of the transmitters WWVB and DCF-77, this is 60 successive information units. Generally, the information units available for evaluation belong to two successive time messages. For example, in every second the frame pulses are distinguished from the pulses representing the binary zeros, the probability is determined with which each pulse has been identified, and the result is in each case entered in the appropriate place in a second area of memory in the processor. Like the first area of memory, the second area of memory covers at least one memory location for every seconds pulse of the time message. The differentiation between the information units and the determination of the probabilities for detection is effected by means of the method described in DE 44 27 885 for the classification of information units by forming area equivalents. The area equivalents obtained here are used as probability values for detection.

Once the number of probabilities corresponding to a complete time message have been stored in the second area of memory, the acquired data is compared with the reference message stored in the first area of memory. The comparison is made memory location by memory location. If the corresponding memory locations do not agree, an error is established in the processor and this is recorded. The reference message is then shifted by one position in the first area of memory and the comparison is repeated location by location between reference message and acquired data. This continues until agreement is established between all relevant locations in the reference message and the acquired data in the second area of memory.

When all relevant information units of the reference message agree with the decoded message after shifts, the number of shifts required is then the value needed to get from the beginning of the second area of memory to the memory location at which a time message begins.

If no agreement can be established between the reference message and the acquired data, the seconds pulses are again decoded in the following minute and, for example, the frame pulses are distinguished from the pulses representing the binary zeros and the probability with which each pulse has been identified is determined. The result is in each case added to the existing result of the previous minute at the corresponding location of the second area of memory of the processor.

If a negative value is used in order to represent the probability of detecting a first information unit (for example a binary zero) and a positive value to express detecting a second information unit (for example a frame pulse), the meaning of the contents of each location in the second area of memory can be converted after adding the probability values for the following minute. If the probability for identifying the first information unit at a specific location is greater than the probability of identifying the second information unit at the same location for the previous minute, the meaning of the location is overwritten. The same effect takes place if there has been an erroneous detection with a high probability but in total the probability value of the information actually transmitted outweighs. Then the reliability of detecting the individual units relevant for comparison with the reference message increases minute by minute. Every minute a new attempt is made to find agreement between the reference message and the acquired values by the comparison process described above.

When the number of shifts towards the beginning of the time message has been established, the value can be used to synchronize the acquisition of information units required for evaluation with the data flow from the time-signal transmitter.

What is claimed is:

1. A method for detecting the beginning of time messages in the signal received from a time-signal transmitter, where the signal of the time-signal transmitter consists of a series of blanking intervals on a carrier signal in the seconds clock cycle in which blanking intervals of different length cause different information units to be created (ZERO pulse, ONE pulse, frame pulse) and a time message comprises the information units transmitted over a period of one minute, and has areas/sectors with defined, constant information units located at fixed points and areas/sectors with variable contents that code the time information wherein a reference message is stored in a first area of memory that contains the defined, constant information units located at fixed areas/sectors;

a number of successive information units corresponding to the length of a time message are stored in a second area of memory;

the contents of the first area of memory are compared unit for unit with the second area of memory;

if an error occurs, the reference message in the first area of memory is shifted by one unit with respect to the received information units and subsequently compared again until no error is found;

when agreement is established, the number of shifts is used to determine the beginning of the received time message.

2. Method in accordance with claim 1, wherein, to reduce the error probability, at least two successive time messages are received and stored overlaid.

3. Method in accordance with claim 2, wherein the received information units are weighted with the probability for their detection.

4. Method in accordance with claim 3, wherein the received units are distinguished between first and second information unit.

5. Method in accordance with claim 4, wherein the probabilities for the first information unit and the second information unit are given different signs.

6. Method in accordance with claim 5, wherein the probabilities for the first information unit are given a negative sign and the probabilities for the second information unit are given a positive sign.

7. Method in accordance with claim 5, wherein the probabilities for the first information unit are given a positive sign and the probabilities for the second information unit are given a negative sign.

8. Method in accordance with claim 4, wherein the first information units are zero pulses and the second information units are frame pulses.

9. Method in accordance with claim 7, wherein on the basis of the established number of shifts, the evaluation of the information units with respect to the information contained in the time message is synchronized with the signal flow of the time-signal transmitter.

* * * * *